United States Patent
Kuhr et al.

(10) Patent No.: US 10,121,009 B2
(45) Date of Patent: Nov. 6, 2018

(54) COMPUTER SYSTEM FOR DISCOVERY OF VULNERABILITIES IN APPLICATIONS INCLUDING GUIDED TESTER PATHS BASED ON APPLICATION COVERAGE MEASURES

(71) Applicant: Synack, Inc., Redwood City, CA (US)

(72) Inventors: Mark Kuhr, Redwood City, CA (US); Jay Kaplan, Redwood City, CA (US)

(73) Assignee: Synack, Inc., Redwood City, CA (US)

( * ) Notice: Subject to any disclaimer, the term of this patent is extended or adjusted under 35 U.S.C. 154(b) by 0 days.

(21) Appl. No.: 14/866,332

(22) Filed: Sep. 25, 2015

(65) Prior Publication Data

US 2017/0091460 A1    Mar. 30, 2017

(51) Int. Cl.
| | |
|---|---|
| G06F 21/00 | (2013.01) |
| G06F 21/57 | (2013.01) |
| G06F 17/30 | (2006.01) |
| G06F 21/71 | (2013.01) |

(52) U.S. Cl.
CPC ...... *G06F 21/577* (2013.01); *G06F 17/30312* (2013.01); *G06F 17/30528* (2013.01); *G06F 21/71* (2013.01); *G06F 2221/033* (2013.01); *G06F 2221/034* (2013.01)

(58) Field of Classification Search
CPC .................................................... G06F 21/577
USPC .................................................. 726/25
See application file for complete search history.

(56) References Cited

U.S. PATENT DOCUMENTS

| | | | |
|---|---|---|---|
| 8,789,187 B1 * | 7/2014 | Pennington | G06F 11/3672 726/22 |
| 2003/0009696 A1 | 1/2003 | Bunker, V et al. | |
| 2009/0087827 A1 | 4/2009 | Goldburd | |
| 2011/0107153 A1 * | 5/2011 | Shufer | G06F 11/3668 714/45 |
| 2015/0040229 A1 * | 2/2015 | Chan | G06F 21/577 726/25 |
| 2015/0237063 A1 | 8/2015 | Cotton et al. | |

OTHER PUBLICATIONS

International Search Report and Written Opinion dated Dec. 2, 2016, International Patent Application PCT/US2016/052541, filed Sep. 19, 2016.

* cited by examiner

*Primary Examiner* — Alexander Lagor
*Assistant Examiner* — Syed M Ahsan
(74) *Attorney, Agent, or Firm* — Davis Wright Tremaine LLP; Philip H. Albert (57) ABSTRACT

A testing system for testing computer system security includes control logic interposed between tester computers and a computer system under test. Tester computers are used by testers to test for security vulnerabilities of the computer system under test. A test results database contains records of tester interactions with the computer system under test and responses of the computer system under test to the tester interactions. A test mark database, coupled to the control logic, contains records related to granular elements of the computer system under test that are amenable to being tested for security vulnerabilities. Records of the test mark database indicate whether a corresponding granular element has been tested for security vulnerabilities. A coverage application, coupled to the test mark database, inputs data from the test mark database and outputs data indicating which granular elements of the computer system under test are to be tested.

14 Claims, 6 Drawing Sheets

| GRAIN ID | URL | STATUS | TIMESTAMP | LAST TESTER | NOTES |
|---|---|---|---|---|---|
| 1 | //index.html | Tested | 1401.1234 | T123 | No vulnerabilities detected |
| 2 | //shop/main.html | Untested | 1405.1057 | T505 | Some bad coding found; soon to be patched |
| 3 | //chat/search.html | Untested | 1403.4555 | T675 | |
| 4 | //shop/sitemap.html | Tested | 1403.4600 | T031 | Found to be secure |
| 5 | ... | ... | ... | ... | ... |
| ... | | | | | |

COMPUTER SYSTEM FOR DISCOVERY OF VULNERABILITIES IN APPLICATIONS INCLUDING GUIDED TESTER PATHS BASED ON APPLICATION COVERAGE MEASURES

FIELD OF THE INVENTION

The present disclosure generally relates to testing of computers relating to security issues. The disclosure relates more particularly to techniques for performing security testing of computer systems and allocating or suggesting areas of focus for testers based on previous coverage of security tests on those computer systems.

BACKGROUND

Performing security testing on a computer system might involve exercising parts of the functionality of the computer system and evaluating whether a security vulnerability exists. For example, if a computer system is supposed to be accessible only to authorized persons and is supposed to block unauthorized persons, a simple test might be for a tester to access the computer system and at a login screen that asks for a user name and a password, type in a known invalid name, such as "nobody" and a known invalid password such as leaving the password field blank and then submitting that as a login. If the computer system responds by allowing the tester past the login screen as if the tester were an authorized person, that indicates that the computer system has a security vulnerability. If the computer system responds by displaying a message such as "Unrecognized user name or password" and remains at the login screen, that may indicate that the computer system might not have that particular vulnerability.

This is, of course, an extremely simple test and fully testing a computer system of moderate complexity for vulnerabilities can be quite involved. For example, a computer system might have a vulnerability that is only noticed if a tester inputs an unexpected string into a field, such as entering "; DROP TABLE users" into a field that is used to enter a user name. The computer system might have many different locations in an application that ask for user name and it might be that some of those correctly respond by refusing to process the improper input while others would process the improper input and perform actions that the designers of the computer system assumed would not be allowed to ordinary users.

A typical computer system might be executing a complex application, such as a web banking application that handles information display, transaction generation and funds transfers, an e-commerce application that handles product display, online shopping, purchasing and shipping, or other complex systems. With such systems, it might not be possible to timely test all possible input points for all possible vulnerabilities.

SUMMARY

A testing system for testing computer system security includes control logic interposed between tester computers and a computer system under test, wherein a tester computer is a computer used by a tester to test for security vulnerabilities of the computer system under test, a test results database, coupled to the control logic, containing records of tester interactions with the computer system under test and responses of the computer system under test to the tester interactions, a test mark database, coupled to the control logic, containing records related to granular elements of the computer system under test that are amenable to being tested for security vulnerabilities, wherein a record of the test mark database indicates whether a corresponding granular element has been tested for security vulnerabilities, and a coverage application, coupled to the test mark database, that inputs data from the test mark database and outputs data indicating which granular elements of the computer system under test are to be tested.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the examples in this disclosure, a computer system being evaluated in a security test is software being executed by one or more processor and hardware comprising the one or more processor, associated memory, network connections, interfaces and the like. Such a computer system might comprise multiple elements, such as multiple computer servers, multiple database servers, network equipment that facilitates data communications between multiple elements and users of the computer system, multiple processors and program instruction storage devices that contain program code corresponding to one or more application programs (applications) that are executed by the computer system.

For simplicity in the explanations here, testers are people or other computer systems that test the computer system by interacting with an application that is executed by the computer system. The term "application" need not be limited to one monolithic program or a single purpose program, but generally refers to that which is being tested for possible security vulnerabilities. In an example security test, a tester selects a particular security test to perform, accesses the application through an available interface, performs some interaction with the application, and the response of the application can indicate whether the application passes or fails (or partially passes, partially fails) that security test.

Examples of available interfaces might be network interfaces, input/output interfaces, computer-to-computer interfaces, hardware interfaces or the like. The available interfaces might include interfaces expected to be used in the normal operation of the application or unexpected interfaces. In an extremely specific example, a tester is a security researcher familiar with common misconfigurations of database servers who executes commands on the tester's computer to access a maintenance interface of a database server under test with the access being over the Internet, sends certain messages to the maintenance interface and the maintenance interface responds with response messages containing sensitive information about the database server and/or its contents that is not information that the designers and/or operators of the database server under test intended to make available over that maintenance interface.

The application could include human-facing interfaces, such as a web server that receives requests from user browsers and responds with HTML pages. The application could also include machine-facing interfaces, such as an application program interface (API) that other programs can use to interact with the application. It is not required that the exact extent of what constitutes an application and its boundaries. Some applications may be amenable to granular division into parts that can be tested for security vulnerabilities. For example, a web application might have functionality for authenticating users (login screens, etc.), serving up static content to browsers on request, accepting user inputs to perform commands, and the like. Each of these might be tested for security separately.

Each granular element, or "grain", of an application might be tested for security separately, or a tester might test multiple grains as part of a security testing session. An application can be made up of many, many grains and each of those grains might be able to be marked in a testing database as being tested or untested. Some parts of an application might be so similar to other parts, that they are together considered one grain so that testing of one is deemed a testing of the other. For example, when grain A is tested, it is marked as tested. When grain A changes, and that change is detected, grain A is marked as untested. A tester takes on a grain as a unit and tests it. A security test management system might maintain test statuses for grains of an application.

The "coverage" of an application is the aggregation of the test marks on the grains. In some embodiments, the coverage is a simple percentage, wherein each grain is equally important, and the tested/untested state is binary. In that case, the coverage % of the application is 100*# of grains marked "tested"/# of grains in the application. In other embodiments, grains can have more than two values (tested, untested) and grain test status might be weighted by time to account for decay over time or for other factors that extend beyond just the binary label.

An example of a grain for a web application that has an API is an API endpoint. The security test management system might keep a record of the API endpoint's response following that grain being tested. If the security test management system detects that the API endpoint's response changes from what was recorded in a significant way, the security test management system can change that record to reflect that the state of that grain is now untested until it is again tested.

An entire workflow might be grouped as a grain even though it might comprise many APIs, views, and interactions that are more specific grains. If security test management system detects a change in a grain belonging to a workflow, the security test management system can we mark the general grain of the workflow as "untested" and the specific grains (e.g., API calls that changed) as "untested" as well, but in some cases, it might be that only one of the general grain or the specific grain changes to the untested state.

There might be more than two levels of grains, such as where the workflow is a grain for testing purposes, but that workflow contains several features that are each their own grains, and smaller units of a feature might have their own grains and get tested separately. Grains might be associated with components or features of the system under test, such as testing each API call as a grain, testing menus as another grain, and system level tests (such as determining if there is a way in an e-commerce system to exploit the flaws in several modules to improperly order goods from the e-commerce system.

Some increased weighting might be provided for more risk-averse interfaces. For example, testing of an informational website for a bank might have lower weight than testing for the ability to falsify transactions. In a specific example, for web apps, mobile apps, and APIs, security test management system is detecting granular changes in a request/response pattern seen but those apps and API, as well as detect changes in embedded program code (such as JavaScript code) that passes between elements of the apps or API.

Testers can be computer security researchers, experts or others, working together or working independently. Where testers are working independently, possibly at different times in different places, on grains of the application under test that are of interest to specific testers and/or relate to their particular expertise, it may be that too many testers are testing some grains and not testing other grains enough. Thus it might be of interest to the operators of the application or a testing service that is tasked with testing the security of the application to know where not enough testing is occurring, or too much redundant testing is occurring. Where the testing is done on an incentive basis wherein a tester is compensated for finding vulnerabilities, it might be of interest for the testers to know this information as well, so that they can focus on more unexplored areas of the application being tested. This information about where testing is needed more than other places might be provided to the testers as a suggestion of where to test or might create requirements such that testers are required to test relatively untested portions of the system under test. There might be a preprogrammed threshold need value that could be used to determine which possible tests to propose to testers.

A coverage score might be used as a measure of how thoroughly parts of an application have been tested. The coverage score for a subsection of an application might be simple ratio of the number of application grains in that subsection that are marked as tested to the total number of application grains in that subsection, or the coverage score could be some other metric, such as is described herein. To compute a coverage score for an application or a portion of an application, a test mark database might be maintained. The database can be a structured database, unstructured data, or other form, distributed or otherwise, such that it is able to indicate which portions of an application have been tested.

The database of test markings might be a listing of the application grains and for each an indication of whether the grain has been tested or not. The database of test markings might, for each application grain, also include other data such as a weighting, an indication of whether the test was done by a human tester or a computerized tester, an indication of when the test was performed, an indication of when the grain was modified, an indication of how thoroughly the grain was tested, and an indication of whether the grain was tested directly or by inference to a related grain.

In some implementations, each grain is equally weighted whereas in others, the testing of one grain is more significant than the testing of another grain and in such implementations, the weighting field of the database of test markings indicates the relative weight of the grains. In some implementations, some tests are performed by human testers and other tests are performed by scanners or other computer processes. In some implementations, the overall weighting of a particular grain's testing (in addition to its stored weighting, if used) is a function of how long the time period is between when it was last tested and a current time, and whether a modification of the grain has been detected since it was last tested. This, possibly combined with other features, might help focus testing on portions of an application that have changed considerably since they were last tested as opposed to testing on portions that are not changing.

The time decay weight applied to a collection of grains might be an exponential decay wherein half of the tested grains are relabeled as untested grains in a given period. The decay might be fixed for each grain, e.g., once a grain is tested it is marked as tested, but if no change has been detected, or insufficient change has been detected, after six months, that grain is marked as being untested anyway.

In some implementations, only grains that are specifically tested are marked as being tested. This may result in separate tests being performed on structurally identical or similar grains. For example, suppose that a news outlet maintains a website that has news articles, each with a comments section, a shopping area for buying clothing branded with that new outlet's brand, and an administrative interface that reporters use to upload new stories. The shopping area of the website can be tested for vulnerabilities, so that unauthorized persons cannot get access to private data or deface the website using the interfaces available there. The administrative interface can also be tested to ensure that private transfers remain private and only authorized users have access to the administrative interface. The news article web pages can also be tested, but there may be tens of thousands of such pages and more added hourly or daily.

Depending on the security needs of the news outlet, it might be sufficient to fully test one news article web page or a few web pages and from there infer that all of the untested web pages would behave in the same manner. In such cases, the grains associated with all of those other web pages might be marked as being indirectly tested by inference as the result of a test of a similar web page. This can also be extended to pages that have identical structure and composition. The security test management system can group grains based on performing an analysis of the DOM structure of the pages.

Where inferential testing is used, it might be useful to have a mechanism, such as appropriately programmed software, that can compare two grains and assess whether they are similar enough that testing of one and finding no vulnerabilities can be used to infer that the other also does not have those vulnerabilities. The software might be described as a similarity engine. The similarity engine might operate based on analyses of document structure or by extracting fingerprints from web pages or application code sections.

Where weighting by change detection is used, a change analyzer in the form of software, perhaps in combination with a processor to execute that software, might be used in a testing environment. The change analyzer might track API behavior of portions of the application under test, such as what API call responses look like, and when there is a detected difference in the format of an API call response, the change analyzer would flag that as a change of that application grain.

An application might be parsed into grains automatically or by human evaluation. Some of the partitioning might be done along logical lines. For example, where the computer system under test is a web server, the application that the web server is serving might be partitioned such that each grain corresponds to a web page served by that application server or one template that is used to generate web pages dynamically. Where the computer system under test is a content server that serves up content more generally, it might be partitioned into granular elements according to an indicated source of content served by the content server. For example, if content is uploaded by many individuals into a social networking system, the granular elements tested might correspond to each individual's contribution to the overall social networking system. Other partitioning logic might be used in addition or instead.

Additional details for particular embodiments of security test management systems that facilitate distributed testing of target systems for security vulnerabilities by distributed testers and related methods of operation are described below with reference to the figures.

Figure 1:
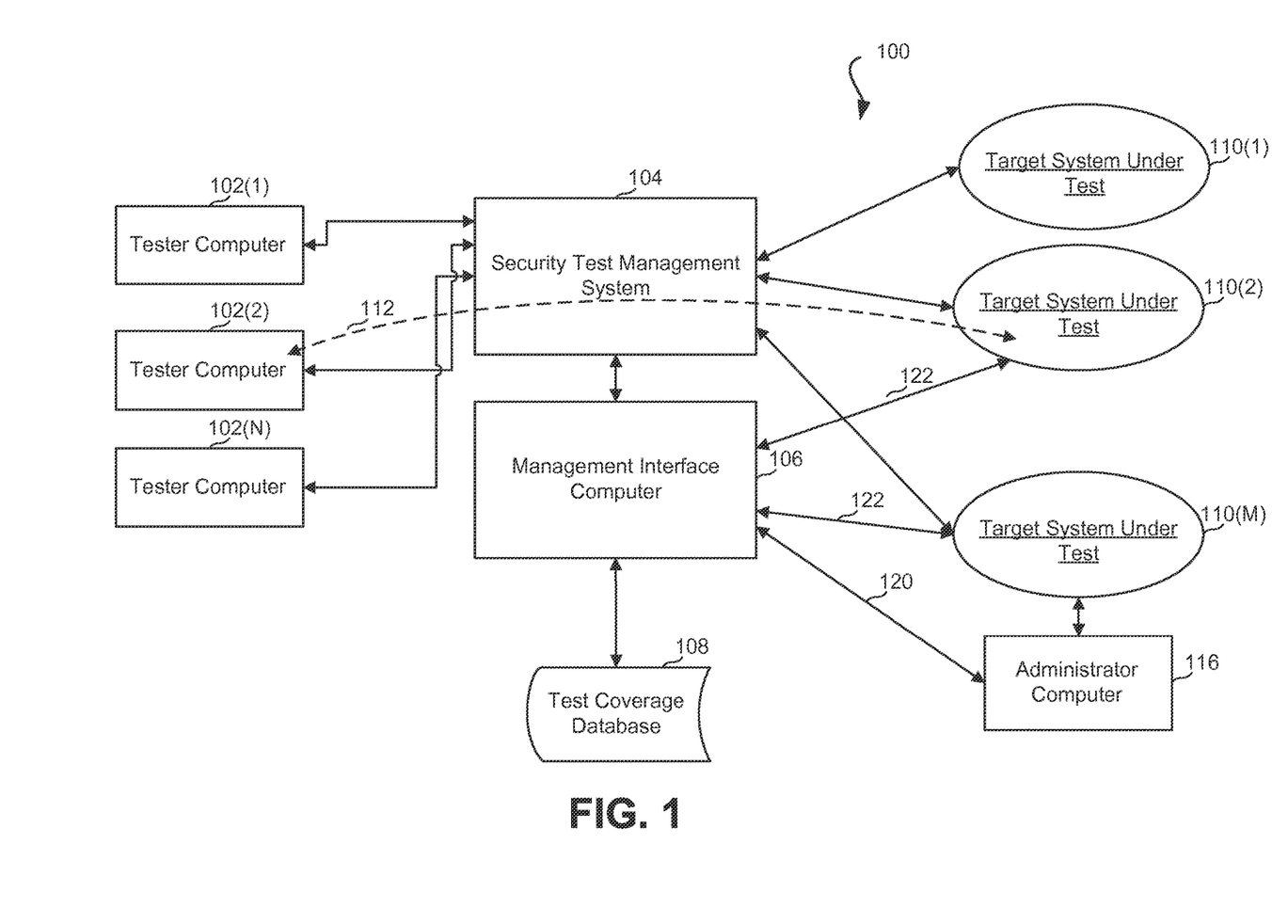
FIG. 1 illustrates an example security test management system arrangement that may be used for crowd-sourced web application vulnerability discovery, providing globally distributed network penetration testing, and determining incentives for promoting the discovery of vulnerabilities.

FIG. 1 illustrates a security test management system arrangement 100 that serves as a test hub with interfaces to testers' computers and interfaces to target systems under test. The test hub might itself be distributed. Data described as being stored by the test hub might be stored in database systems, data structures, file structures, etc., fully maintained by the test hub or in some cases stored under the control of a target system, such as when it is convenient to store test data about a target system with the target system. In some embodiments, the test hub is a launch point computer that handles all of the traffic between tester computers and the target system, as well as arrangements with testers such as a compensation system, chat system, and resource providing system. The test hub might thus be used for crowd-sourced web application vulnerability discovery, providing globally distributed network penetration testing, and determining incentives for promoting the discovery of vulnerabilities. The testers might be computer professionals with particular security skill sets.

As illustrated in FIG. 1, tester computers 102 interface with a security test management system 104 (a test hub), which is managed by a management interface computer 106, so as to keep track of the various testers using test hub 104 and their activities. Management interface computer 106 maintains a test coverage database 108 that reflects what parts of target systems 110 have been tested. In this illustration, there are multiple tester computers 102. It may be that there is one tester computer 102 per tester or testers share computers, but this detail is not necessary for full understanding of the system shown. The number of tester computers might be in the hundreds or thousands when crowd-sourcing is being done to solve security problems. The number of target systems 110 under test need not be precisely specified and may vary from time to time. Management interface computer 106 is sufficiently powerful to keep track of which tester computers are being used and which target systems are being tested.

A test session might comprise a sequence of interactions between a tester computer 102 under the control of a tester, such as a security researcher attempting to identify vulnerabilities in a specific target system or test for robustness, possibly in exchange for incentives offered to testers. One such session is illustrated by the dashed line 112 representing a test session wherein a tester using tester computer 102(2) is testing target system 110(2). Target systems might also have associated administrator computers 116 so that the owners/managers of the target systems can access the target system to do their own review of testing activities, follow through with remediation, fixes, and other activities.

Because test hub 104 is the interface between tester computers and target systems, test hub 104 can monitor interactions, obfuscate interactions (such as to keep details of the target systems unknown to the testers for security of the target system, so that testing is a fair test of security, or for other reasons), and to facilitate replay of detected vulnerabilities for compensation operations, remediation operations, or other operations. The interconnections illustrated in FIG. 1 might be by network connections, such as Internet connections, LAN connections or other methods or means of electronically interacting.

In an embodiment, each tester computer 102 is associated with one of a plurality of distributed testers of the type previously described. Tester computers 102 may comprise desktop computers, workstations, laptop computers, netbook computers, ultrabook computers, tablet computers or smartphones. Tester computers 102 are coupled indirectly to test hub 104 by any combination of one or more local area networks, wide area networks, internetworks and the like, which may include the public Internet.

Test hub 104 may execute a separate process for each target system under test. In an embodiment, test hub 104 acts as a terminal that is configured for the purposes of providing network connectivity and monitoring for communications between tester computers 102 and target systems 110. In addition to providing an interface to tester computers, the logical position of test hub 104 between the tester computers and the target systems provides secure routing of tester communications to target systems and provides a predictable source IP address for the owner/operator of the target systems. This allows the owner/operator of the target system under test to limit access to certain elements of the target system to testers, such as by adjustment of firewalls and/or IPS/IDS devices.

Test hub 104 may be configured to provide a particular tester computer with access to a particular target system only under specified circumstances including after assessment, testing, assignment of a project, or other operations. Thus, tester computers typically cannot contact the target systems at will, but instead, test hub 104 facilitates access, grants access or provides credentials.

In an example test session, a tester uses his or her tester computer 102(1) to access test hub 104 and obtain details of one or more tests to be performed. The tests provided or made available to the tester might be a function of what the tester is approved to test. The tests provided might be large enough to allow for tester selection of the tests to be performed in the test session. For example, the tester might opt for tests that match the tester's expertise that is not known to test hub 104 or the tester might opt for tests that involve testing areas of a target system that are indicated as being relatively untested.

Management interface computer 106 can generate data about what grains of an application running on a target system are relatively untested. This might be in the form of some graphic display where the display is a representation of data from test coverage database 108. After viewing this display, the tester might select a set of tests to run in order to maximize the tester's chances of finding vulnerabilities not already discovered by others. Selection of a test to run as part of a test session need not be an enumerated list that the tester selects from. For example, a tester might notice that a shopping app portion of a target system is relatively untested relative to a chat portion of the target system and decide to look for credit card validation vulnerabilities such as checking whether the target system would return data that is not supposed to be visible to the public in response to the tester inputting escape characters into a credit card form on a shopping web page.

Link 120 in FIG. 1 illustrates that administrator computer 116 can communicate with management interface computer 106. This communication might include administrator computer 116 analyzing the target system under test or parsing source code that is supposedly running on the target system in order to identify the grain boundaries in the applications that are running on the target system. This grain boundary information can be stored in test coverage database 108 and used during testing. Link 122 in FIG. 1 illustrates that management interface computer 106 might directly scan a target system to determine grain boundaries and structures of the application. The scanning of a target system might be a hyperlink crawling process.

At test hub 104, the interactions with the target systems might be largely web-based. The assignment of a test session to a particular tester may comprise granting access to the tester computer to a web portal for web applications that are within the scope of the test session. The web portal may provide, for example, a screen view that displays the identity and general content of computers, networks or other resources that are within the scope of a particular vulnerability research project and a graphic display of what portions of the project relate to extensively tested grains. The identity of target system owner/operators might be shielded from the testers for reasons described herein elsewhere, but might also be anonymized so that testers are not aware of exactly whom they are attacking, to prevent the introduction of bias into the vulnerability detection process.

In one embodiment, initiating a test session comprises instantiating a virtual machine in a shared data center, such as a cloud computing facility, that implements test hub 104 as a server instance or other computing instance. Thus, the test hub 104 may be spun up on demand. Any such server may be instantiated at a geographical location that is based upon a location of the particular tester who is involved in a project. Reports of vulnerabilities may be received periodically from any of the testers who are assigned to a project for a test session.

A given tester might be assigned to a project and be able to view data about what portions of a system under test have been tested and what portions are untested and then make a decision as to what vulnerabilities to attempt to detect. In other variations, management interface computer 106 determines specific grains that need testing and provides the tester with an indication of a specific grain to test or a series of grains to test.

In an embodiment, data comprising a vulnerability report is received in the same view or user interface facility that is used to obtain data about projects, target computers and target networks. In an embodiment, to report a prospective vulnerability, the tester enters a category value and optionally a sub category value for the vulnerability that they are reporting. The category and sub category values are deemed proposed and are subject to validation by the service provider. In some embodiments, reporting a prospective vulnerability may comprise receiving data values in fields of a submission form.

As an example, a submission form may comprise data fields for Title, Description, Vulnerability Category (perhaps as a drop-down menu selection), text to indicate steps needed to reproduce the vulnerability, an indication of the impact of the vulnerability, recommended fixes, and perhaps a URL at which the vulnerability exists. The tester might also signal that the grain has been tested or, alternatively, management interface computer 106 can make an assessment as to whether testing is completed for that grain independent of the opinion of the tester.

In an embodiment, test hub 104 and/or management computer interface 106 might provide for tester-tester communications to assist with researching vulnerabilities. These capabilities include acting as an intermediary for such communications, logging messages and serving as a message store-and-forward service with which management interface computer 106 may compose a message and request dispatch to the particular tester computer 102. In this manner, the administrator computer 116 of a particular customer of test hub 104 may re-engage the tester computer 102, for example, to request a re-validation to check if a particular vulnerability was successfully corrected or patched as a result of remediation operations that the customer performed. In some embodiments, the management interface computer 106 or another system may convey a fixed fee to an account of the tester in consideration for such a re-evaluation.

Embodiments may be used to implement incentive programs to induce or encourage testers to use tester computers 102 to locate vulnerabilities. In one embodiment, a process of identifying computer vulnerabilities may integrate the offering, determination and payment of fees to testers as an inducement to discovery vulnerabilities. The inducement benefit of such a method may be enhanced, in one embodiment, by publishing an approximate range of fees that will be paid and information about how a vulnerability score of a particular vulnerability is mapped within the range to yield a particular fee. In this manner, testers in the field receive objectively understandable information about how a fee will be determined and paid, which should improve confidence in the overall method and system. The data about test coverage (what degree of tested versus untested portions or grains of an application running on a target system are present) can also be disclosed, so that testers can decide to focus on the relatively untested areas of an application.

Figure 2:
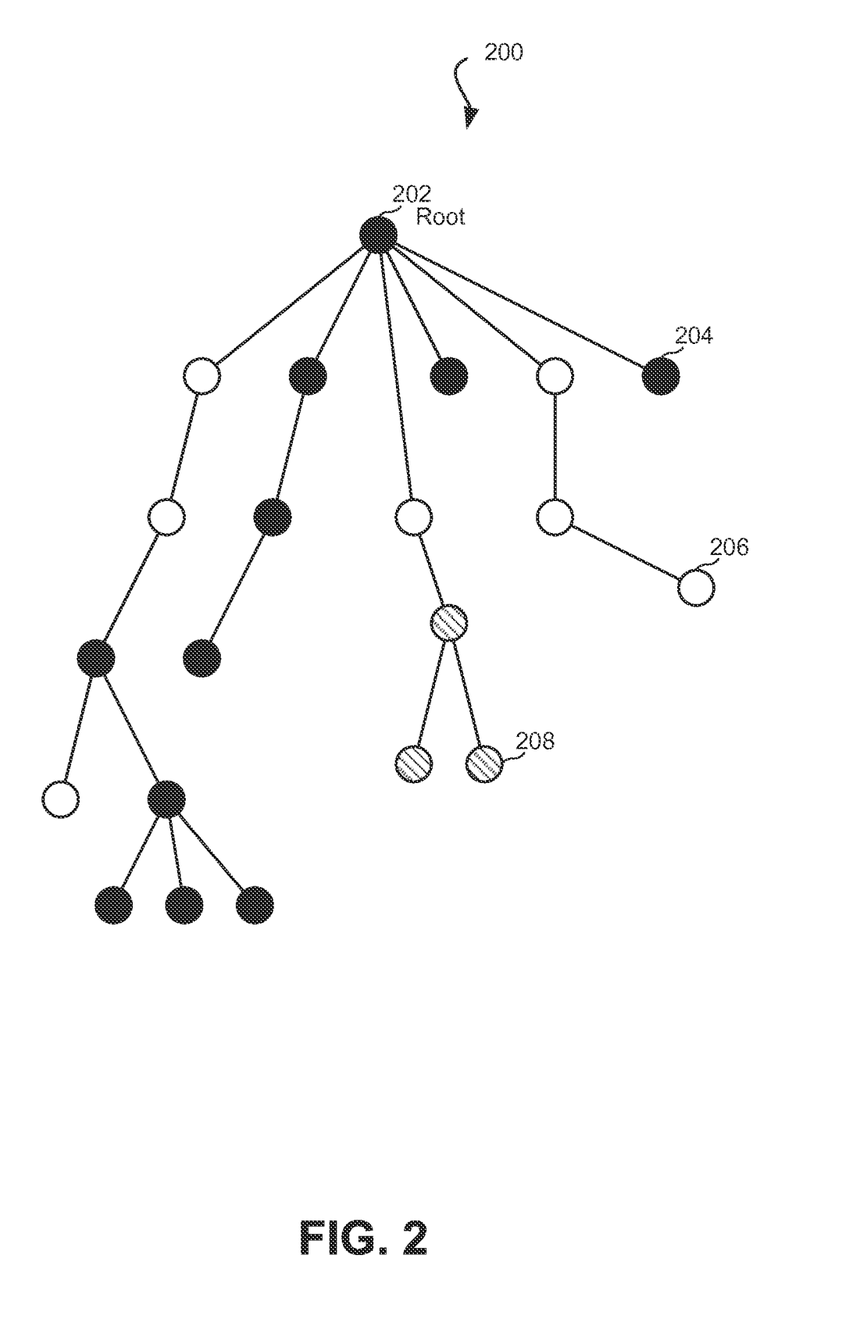
FIG. 2 illustrates data that might be maintained in the test coverage database of FIG. 1.

FIG. 2 illustrates data that might be maintained in test coverage database 108 shown in FIG. 1. The display of coverage data for a particular application can take many forms, such as searchable data, a graphical display, a table of data, or other forms that would be informative and useful to a tester. In this example 200, the grains of an application (the circles) happen to be arranged in a graph structure where the grains are nodes of the graph. This can be considered a directed graph with edges exiting nodes to lower nodes. This graph might represent webpages with the edges representing hyperlinks and the nodes corresponding to a URL of a web application. The grains/nodes of the graph might have different uses, with some nodes representing a subset of a webpage, a routine within a subroutine, a feature of an interface, an API call or other granular element that can be tested for vulnerabilities.

This data conveys a coverage map. In the example shown, a root node 202 is fully filled in, representing that the root grain (such as a home page) has been tested. Other filled in nodes, such as node 204, also represent grains that have been tested. The unfilled nodes, such as node 206 represent grains that have not been tested. The hash-filled nodes, such as node 208, correspond to grains that have been tested but have changed since being tested.

In a more general case, edges need not be represented between grains. Also, it may be that a given element, such as an API call or a web page, will have multiple nodes displayed, representing the case where there are multiple categories of tests that might be done with respect to that element. For example, it may be that many possible tests could be run on the element and they are grouped into categories, with a separate tested/untested designation for each category. For example, suppose testing of an API can involves automated speed testing to determine if an API can be overloaded by too many API calls at once as well as testing whether malformed function calls will cause a security breach. The automated speed testing might be done by an expert at denial of service attacks and might involve extensive testing, while the malformed function calls would also require extensive testing but done by a different type of researcher or tester. For some systems, it might make sense that a mere visit to a web page should count for something and that can be a category of test; this would allow for researchers to focus only on unvisited web pages. In such cases, there might be multiple tested/untested designations for one grain.

Thus the illustration of FIG. 2 might be expanded to one with multiple colors, one for each category of tests or different nodes in the example 200 might be for the same grain. Other forms of display might be provided to show more of a planar map to allow a tester to absorb spatial trends over a large number of data points.

Figure 3:
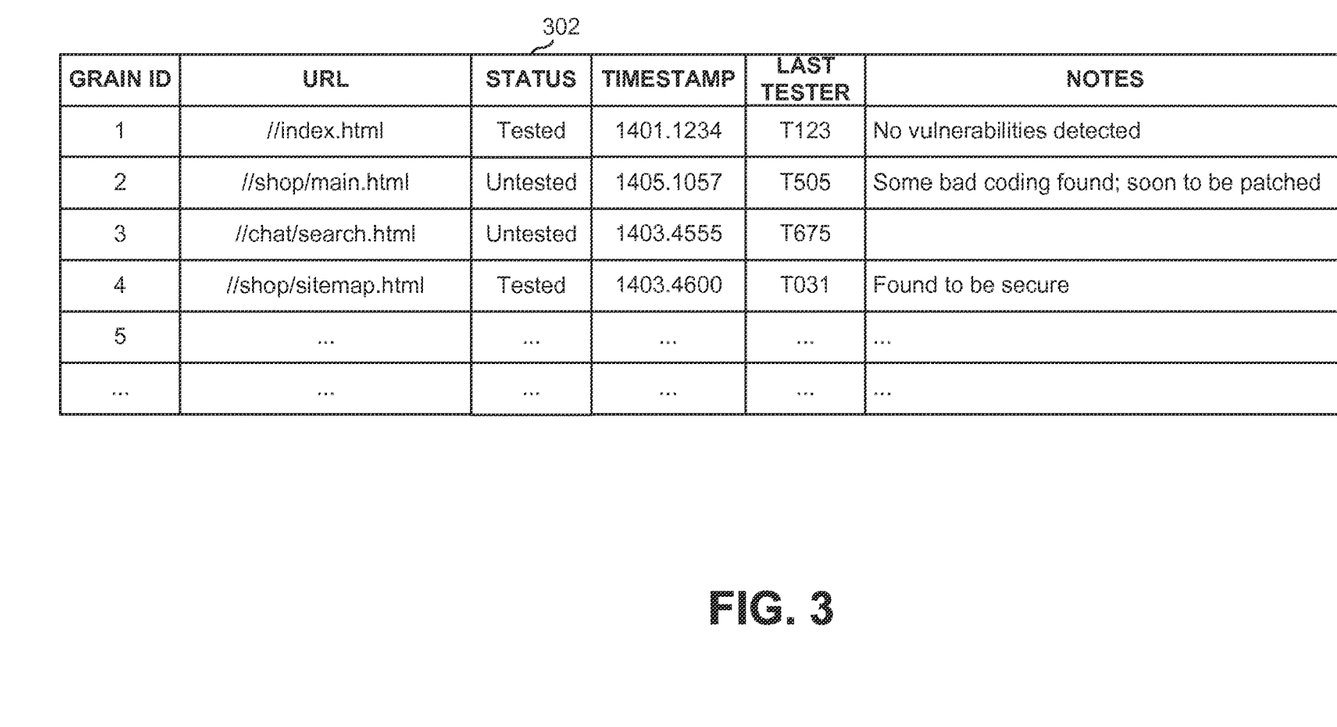
FIG. 3 is a representation of a portion of the testing database that might be maintained as part of test coverage database of FIG. 1.

FIG. 3 is a representation of a portion of a testing database that might be maintained as part of test coverage database 108 shown in FIG. 1. In that example, there is a table 302 of test data per grain. Each grain has in table 302 a URL associated with that grain, a status (tested, untested), a timestamp of the last test date/time (digitized as a number), the tester identifier of the last tester to test that grain, and notes (as might be entered by a reviewer or the tester. From this data, coverage metrics can be calculated over an application or some large set of grains.

Figure 4:
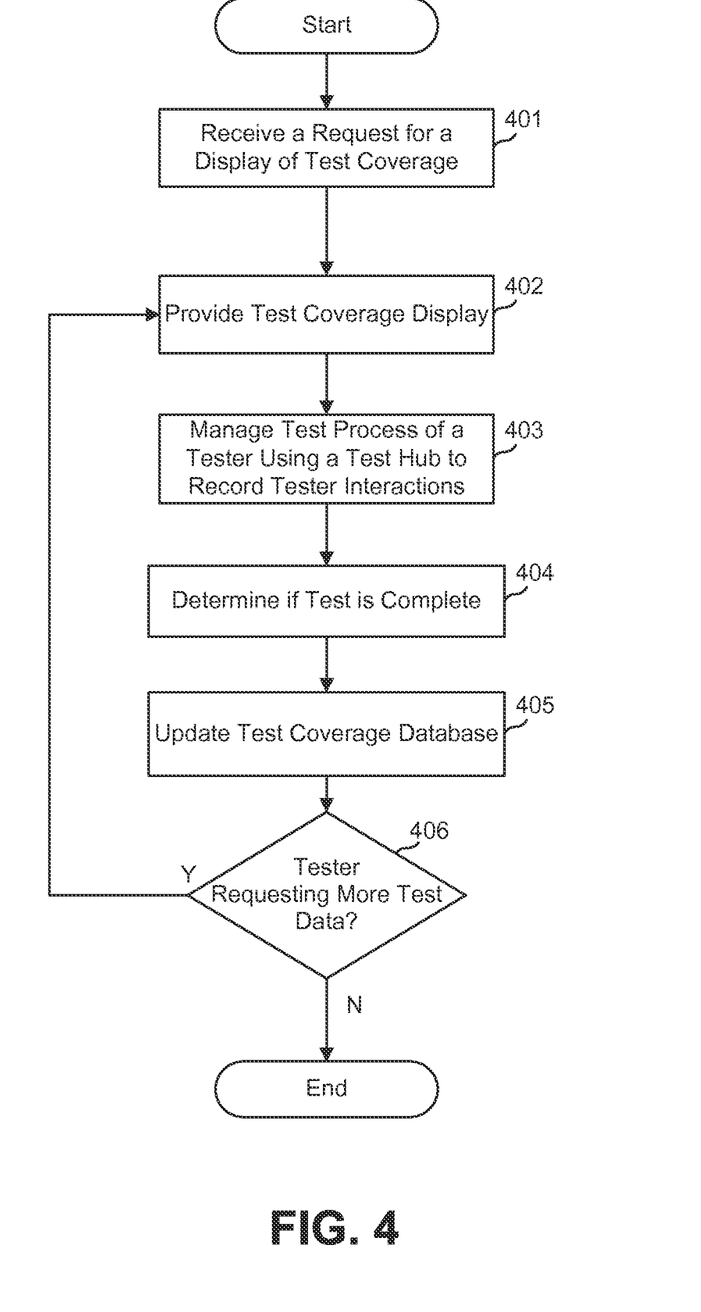
FIG. 4 is a flowchart of a test process.

FIG. 4 is a flowchart of a test process. In that process, a test hub receives a request for a display of test coverage (step 401) and the test hub provides the display of test coverage (step 402). The test hub manages the process of a tester performing the test (step 403), and then determines if the test is complete (step 404). If the test is complete or if other data is to be updated, the test hub updates a test coverage database (step 405). The test hub then determines if the tester is requesting more test data (step 406) so as to continue a test session. If yes, the test hub continues with step 402, otherwise it ends the test session for that tester. Many such test sessions might be executing at the same time.

Figure 5:
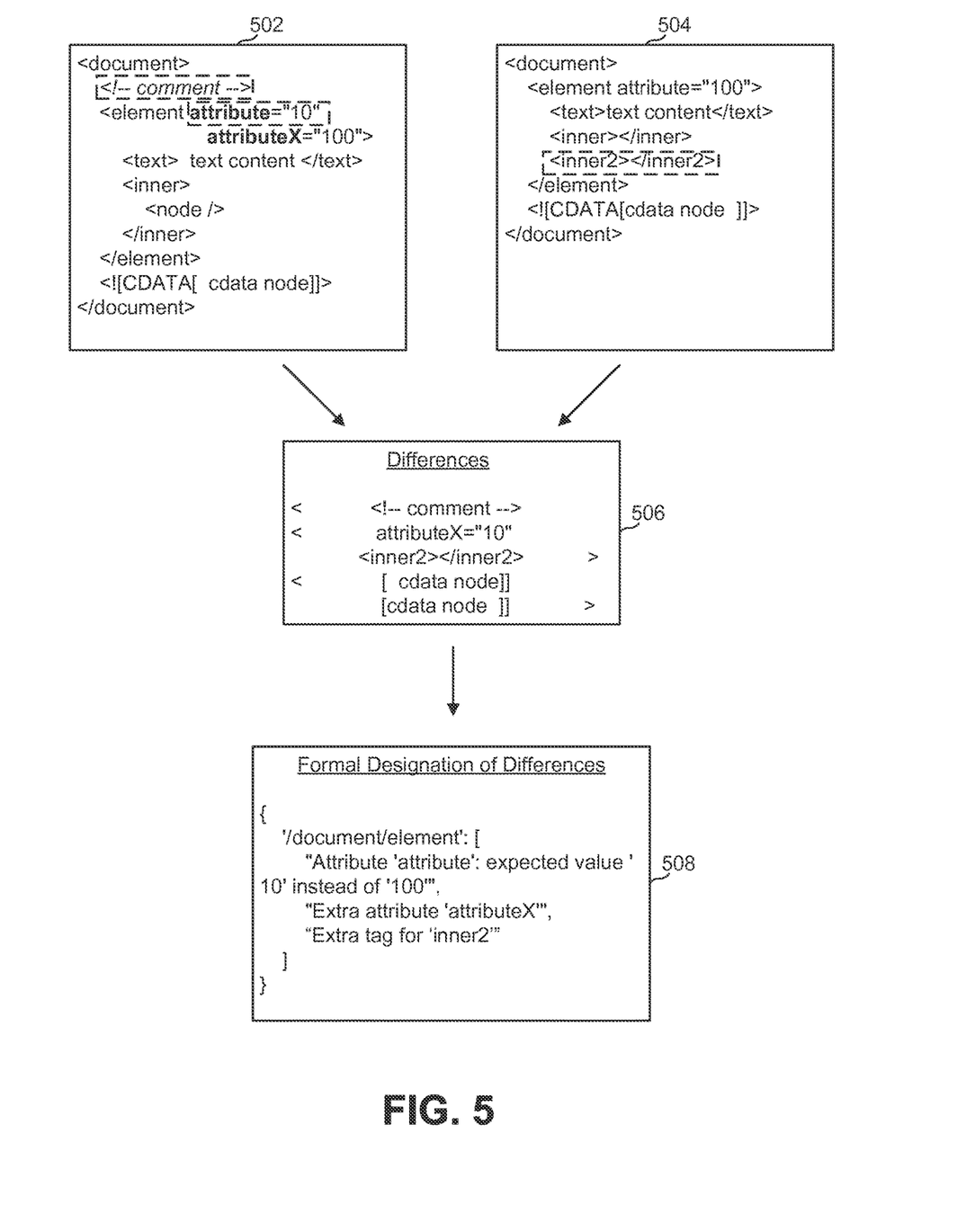
FIG. 5 is an illustration of inputs and outputs of a process for evaluating similarity of two document structures.

FIG. 5 is an illustration of inputs and outputs of a process for evaluating similarity of two document structures that are similar enough that one obtains inferred test status because of the testing of the other. As illustrated there, there are two documents 502, 504. Documents 502, 504 might be stored in computer-readable memory. Documents 502, 504 might be encountered as a scanner, crawler or other program identifies documents that are part of a website or application being tested or to be tested. Those documents have differences, some of which are identified by dashed boxes. The process then compares the documents to arrive at a set of differences 506, which might be stored in memory or as another document. While the set of differences 506 may include many differences, some of them are deemed not significant for the purposes of comparison. For example, since documents 502, 504 comprise XML code, the second line of document 502 is a comment and does not affect operations involving that XML code except to provide information to a reader of the XML code. Therefore, that comment is not significant when trying to determine if there are vulnerabilities in the XML code. In other contexts, that line might be significant.

A data structure 508 represents a formal description of the significant differences between the two documents. Data structure 508 might itself be stored into memory and/or saved as a document. The process that evaluates documents 502, 504 might determine, based on a set of rules that the process operates with, that none of the differences in data structure 508 are significant, where significance in this context refers to whether the security posture of the two documents is different given those differences. For example, document 504 contains an XML structure "<inner></inner>" that is not present in document 502. Since that XML structure is otherwise empty and it is well-formed (e.g., not present with escape characters or anomalies), the process rules might be such that well-formed, empty XML structures can be discounted. In that case, the process would deem that document 502 and document 504 are similar enough that if document 502 is security tested and passes the test, then document 504 can be flagged as being security tested without having to be separately tested. Of course, documents 502, 504 are very simply documents, provided for teaching examples, and typical XML documents being assessed would be longer and more complicated.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
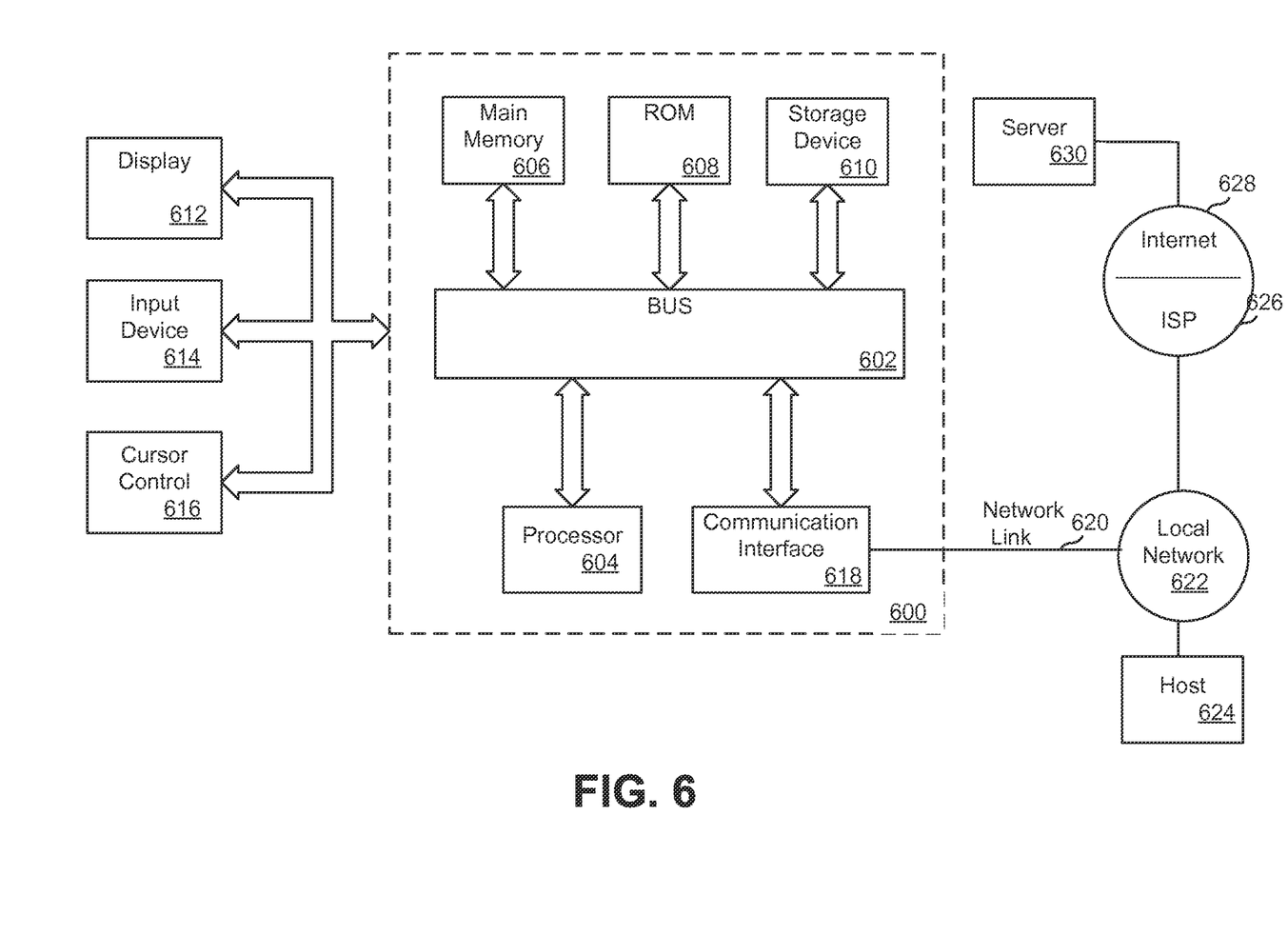
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A testing system for testing computer system security, comprising:
　a test hub interposed between tester computers and a computer system under test, wherein a tester computer is a computer used by a tester interacting with the computer system under test to test for security vulnerabilities of the computer system under test, and wherein the test hub is configured to monitor communication between the tester computers and the computer system under test to facilitate replay of detected vulnerabilities and to provide secure routing of communications of the tester computers to the computer system under test wherein the test hub has an access to the computer system under test that is specific to the test hub;
　a test results database, coupled to the test hub, containing records of tester interactions with the computer system under test and responses of the computer system under test to the tester interactions;
　a similarity engine that determines that a second set of granular elements is similar to a first set of granular elements;
　a test mark database, coupled to the test hub, containing records related to granular elements of the computer system under test that are amenable to being tested for security vulnerabilities, wherein a record of the test mark database indicates whether a corresponding granular element has been tested for security vulnerabilities, and wherein the test mark database includes indicators of inferred testing of the second set of granular elements where the similarity engine has determined that the second set of granular elements is similar to the first set of granular elements;

a coverage application, coupled to the test mark database that inputs data from the test mark database and outputs data indicating which granular elements of the computer system under test are to be tested.

2. The testing system of claim 1, further comprising a tester interface that provides the tester computers with a relative need indication for testing over a plurality of granular elements of the computer system.

3. The testing system of claim 2, wherein the tester interface is configured to limit tester computers to testing granular elements in the plurality of granular elements by limiting testing to those granular elements with a relative need that exceeds a preprogrammed threshold need.

4. The testing system of claim 1, wherein the second set of granular elements is found to be similar to the first set of granular elements when a document structure is similar between the second set of granular elements and first set of granular elements.

5. The testing system of claim 1, wherein the second set of granular elements is found to be similar to the first set of granular elements when a fingerprint is similar between the second set of granular elements and first set of granular elements.

6. The testing system of claim 1, wherein the test mark database includes indications of whether granular elements have been tested for security vulnerabilities by human testers or by computer-program driven testing processes.

7. The testing system of claim 1, wherein the test mark database includes indications of time periods between when granular elements were tested for security vulnerabilities and a current time.

8. The testing system of claim 1, wherein the test mark database includes indications of detected changes in the granular elements after being tested for security vulnerabilities.

9. The testing system of claim 1, further comprising a change analyzer that indirectly detects changes in the granular elements based on changes to structures of the responses from the granular elements.

10. The testing system of claim 1, the computer system under test is a web server and the computer system under test is partitioned into granular elements according to web pages served by the web server.

11. The testing system of claim 1, the computer system under test is a content server and the computer system under test is partitioned into granular elements according to an indicated source of content served by the content server.

12. The testing system of claim 1, the computer system under test is a web server and the computer system under test is partitioned into granular elements according to web pages served by the web server, wherein the tester interface is configured to limit tester computers to testing granular elements in the plurality of granular elements by limiting testing to those web pages with a relative need that exceeds a preprogrammed threshold need.

13. The testing system of claim 1, wherein the tester computers interface with the test hub, the test hub tracking tester interactions produced by the tester computers, the test hub further recording the tester interactions in the test results database.

14. The testing system of claim 1, wherein the test hub receives a request from a tester computer of the tester computers, provides a display of test coverage from the coverage application to the tester computers, and then monitors the tester computer to determine if the tester computer completes testing a granular element for security vulnerabilities.

* * * * *